US012727613B2

(12) United States Patent
Hu et al.

(10) Patent No.: US 12,727,613 B2
(45) Date of Patent: Sep. 8, 2026

(54) **THREE-DIMENSIONAL (3D) PRINTING INK FOR *PLEUROTUS ERYNGII* AND PREPARATION METHOD FOR AND USE OF 3D PRINTING INK AND PREPARATION METHOD FOR 3D PRINTED FOOD OF *PLEUROTUS ERYNGII***

(71) Applicants: NANJING UNIVERSITY OF FINANCE & ECONOMICS, Nanjing City (CN); NANJING AGRICULTURAL UNIVERSITY, Nanjing City (CN); JIANGSU ALPHAY BIO-TECHNOLOGY CO., LTD., Nantong City (CN)

(72) Inventors: Qiuhui Hu, Nanjing City (CN); Anqi He, Nanjing City (CN); Liyan Zhao, Nanjing City (CN); Gaoxing Ma, Nanjing City (CN); Hui Chen, Nanjing City (CN); Huihua Zheng, Nanjing City (CN); Ning Ma, Nanjing City (CN); Lei Zhong, Nanjing City (CN)

(73) Assignees: NANJING UNIVERSITY OF FINANCE & ECONOMICS, Nanjing City (CN); NANJING AGRICULTURAL UNIVERSITY, Nanjing City (CN); JIANGSU ALPHAY BIO-TECHNOLOGY CO., LTD., Nantong City (CN)

( * ) Notice: Subject to any disclaimer, the term of this patent is extended or adjusted under 35 U.S.C. 154(b) by 831 days.

(21) Appl. No.: 18/073,669

(22) Filed: Dec. 2, 2022

(65) Prior Publication Data

US 2024/0057654 A1 Feb. 22, 2024

(30) Foreign Application Priority Data

Aug. 18, 2022 (CN) ........................ 202210992288.X

(51) Int. Cl.

| | |
|---|---|
| ***B33Y 50/02*** | (2015.01) |
| ***A23B 2/92*** | (2025.01) |
| ***A23L 29/238*** | (2016.01) |
| ***A23L 29/256*** | (2016.01) |
| ***A23L 31/00*** | (2016.01) |
| ***A23P 10/30*** | (2016.01) |
| ***A23P 30/20*** | (2016.01) |
| ***B33Y 70/00*** | (2020.01) |

(52) U.S. Cl.
CPC ................ *A23P 10/30* (2016.08); *A23B 2/92* (2025.01); *A23L 29/238* (2016.08); *A23L 29/256* (2016.08); *A23L 31/00* (2016.08); *A23P 30/20* (2016.08); *B33Y 50/02* (2014.12); *B33Y 70/00* (2014.12)

(58) Field of Classification Search
None
See application file for complete search history.

(56) References Cited

FOREIGN PATENT DOCUMENTS

| | | | |
|---|---|---|---|
| ID | P201504835 A * | 10/2015 | |
| JP | 2004344035 A * | 12/2004 | |
| WO | WO-2020152689 A1 * | 7/2020 | ................ A23J 3/16 |

OTHER PUBLICATIONS

Das et al "Edible Mushrooms as Functional Ingredients for Development of Healthier and More Sustainable Muscle Foods: A Flexitarian Approach", Molecules Apr. 23, 2021, pp. 1-25 (Year: 2021).*
Murphy, Cindee "We're Wild about Our Mushrooms" pp. 1-11, Pies & Plates' Healthy Living Kitchen 2017 https://archive.constantcontact.com/fs086/1102575234700/archive/1102644030243.html (Year: 2017).*
Zambrano "3D printing of meat" 2021 The University of Queensland Australia pp. ii, 86, and 161 (Year: 2021).*

* cited by examiner

*Primary Examiner* — Kelly J Bekker
(74) *Attorney, Agent, or Firm* — Element IP, PLC

(57) ABSTRACT

The present disclosure relates to a three-dimensional (3D) printing ink for *Pleurotus eryngii* and a preparation method for and use of the 3D printing ink and a preparation method for 3D printed food of *Pleurotus eryngii*. The present disclosure adopts *Pleurotus eryngii* freeze-dried powder which reduces a moisture content of *Pleurotus eryngii*. In addition, the problem that the *Pleurotus eryngii* with high fiber content blocks a nozzle for 3D printing can be solved by making the *Pleurotus eryngii* into small particle powder, and bioactive substances in the *Pleurotus eryngii* can be retained as much as possible. The addition of hydrocolloid can improve rheological properties of the *Pleurotus eryngii* freeze-dried powder, which increases viscosity of the 3D printing ink for *Pleurotus eryngii*, and enhances mechanical strength of the 3D printing ink, such that the ink can maintain the print shape and is not easy to collapse.

5 Claims, 3 Drawing Sheets

THREE-DIMENSIONAL (3D) PRINTING INK FOR *PLEUROTUS ERYNGII* AND PREPARATION METHOD FOR AND USE OF 3D PRINTING INK AND PREPARATION METHOD FOR 3D PRINTED FOOD OF *PLEUROTUS ERYNGII*

CROSS REFERENCE TO RELATED APPLICATION

This patent application claims the benefit and priority of Chinese Patent Application No. 202210992288.X, filed with the China National Intellectual Property Administration on Aug. 18, 2022, the disclosure of which is incorporated by reference herein in its entirety as part of the present application.

TECHNICAL FIELD

The present disclosure belongs to the technical field of food, and particularly relates to a three-dimensional (3D) printing ink for *Pleurotus eryngii* and a preparation method for and use of the 3D printing ink and a preparation method for 3D printed food of *Pleurotus eryngii.*

BACKGROUND 3D printing, also known as additive manufacturing, is a technology which uses powdery adhesive materials as materials to construct objects through layer by layer printing based on digital model files. It has great potential in manufacturing complex geometric shapes, fine textures, and customized nutrients. However, there are still many obstacles in the application of 3D printing technology in the field of food, such as the limited printing materials, poor printing precision, and low stability in the subsequent curing process. Therefore, on the basis of existing equipment, improving the formula of printing materials can not only apply 3D printing technology to the field of food, but also improve the nutritional value of printed products.

In the extrusion process, food materials need to be in a semi-solid or viscous state to finish fine printing smoothly through the nozzle of the printer, so the rheological property of printing materials is one of the most critical factors for extrusion 3D printing. Due to the high moisture content and low viscosity, the materials of fruits and vegetables have strong fluidity and are not easy for molding after being beaten, and are very likely to block the nozzle due to the high fiber content, so they are called food materials without natural printing characteristics. Therefore, in order to improve the rheological properties and printing properties of food materials, Zhang Min et al. invent an adjusting and control method for 3D printing precise shape forming of instant recuperation mashed potatoes (Publication No.: CN 106805280 A). A certain amount of hydrocolloid (such as pectin and xanthan gum) is added to the mashed potatoes to improve the rheological properties and corresponding printing properties of the mashed potatoes. Chocolate powder is added to improve the taste and molding characteristics of the mashed potatoes. The optimal printing conditions can be achieved by adjusting different printing parameters, such as a printing distance, a nozzle diameter, a printing temperature, a moving speed of the nozzle, and a discharging speed, so as to make the printed object more precise. Jiang Hao et al. invent a potato starch-based 3D printed food material and a preparation method thereof (Publication No.: CN 108208768 A). The preparation method includes the following steps: mixing water with potato starch, preparing a mixed solution from chitosan and carboxymethyl cellulose, mixing butter, protein, and an inorganic salt, and finally mixing and heating all above materials to completely gelatinize the starch and achieve uniform mixing, which improves the mechanical strength and printing precision of the 3D printing materials and prolongs the food preservation time. Li Dajing et al. invent a 3D-printed Chinese yam starch loaded carotenoid sustained release preparation and a preparation method thereof (Publication No.: CN 114128884 A). The preparation method includes the following steps: mixing Chinese yam starch with hydrocolloid, gelatinizing with hot water, adding carotenoid, stirring, standing and cooling to form gel, and preparing the Chinese yam starch loaded carotenoid sustained release preparation through 3D printing.

However, the above printing materials are mostly starchy foods or food materials with high starch content, which have high viscosity due to the high starch content and are thus easy for 3D molding. However, the material of edible fungi such as *Pleurotus eryngii*, which contains high dietary fiber and high protein, has low viscosity because it does not contain sticky substances such as starch, which is likely to block the nozzle and is not easy for molding, resulting in low 3D printing precision.

SUMMARY

In view of this, an objective of the present disclosure is to provide a 3D printing ink for *Pleurotus eryngii* and a preparation method for and use of the 3D printing ink and a preparation method for 3D printed food of *Pleurotus eryngii*. The 3D printing ink for *Pleurotus eryngii* provided by the present disclosure has excellent 3D printing formation and high printing precision.

To achieve the above objective, the present disclosure provides the following technical solutions.

The present disclosure provides a 3D printing ink for *Pleurotus eryngii*, including the following materials by mass percent:

20-30% of *Pleurotus eryngii* freeze-dried powder, 2-4% of hydrocolloid, and the balance of water.

The *Pleurotus eryngii* freeze-dried powder has a particle size less than or equal to 0.15 mm.

The hydrocolloid includes one or more selected from the group consisting of sodium alginate, gellan gum, pectin, methyl cellulose, locust bean gum, and guar gum.

Preferably, the hydrocolloid includes one or more selected from the group consisting of the sodium alginate, the locust bean gum, and the guar gum.

Preferably, a preparation method for the *Pleurotus eryngii* freeze-dried powder includes conducting vacuum freeze-drying on *Pleurotus eryngii* at 20-60° C. for 12-24 h.

Preferably, the vacuum freeze-drying is conducted at a vacuum degree of 0.2 MPa.

The present disclosure further provides a preparation method for the 3D printing ink for *Pleurotus eryngii* according to the above technical solutions, including the following steps:

mixing the *Pleurotus eryngii* freeze-dried powder, the hydrocolloid, and the water, and conducting water-bath heating to obtain the 3D printing ink for *Pleurotus eryngii.*

Preferably, the water-bath heating is conducted at 80-90° C.

Preferably, the water-bath heating is conducted for 20-30 min.

The present disclosure further provides a use of the 3D printing ink for *Pleurotus eryngii* according to the above technical solutions or a 3D printing ink for *Pleurotus eryngii* prepared by the preparation method according to the above technical solutions in 3D printed food.

The present disclosure further provides a preparation method for 3D printed food of *Pleurotus eryngii*, including the following steps:

providing a printing model, setting 3D printing parameters, and generating a G-code;

using a 3D printing ink for *Pleurotus eryngii* for 3D printing according to an instruction of the G-code to obtain the 3D printed food of *Pleurotus eryngii*.

The 3D printing ink for *Pleurotus eryngii* is the 3D printing ink for *Pleurotus eryngii* according to the above technical solutions or a 3D printing ink for *Pleurotus eryngii* prepared by the preparation method according to the above technical solutions.

Preferably, the 3D printing parameters are as follows: a printing height of 1.0-1.4 mm, a nozzle diameter of 1.0-1.4 mm, a nozzle moving speed of 20-30 mm/s, and a fill density of 70-90%.

The present disclosure provides a 3D printing ink for *Pleurotus eryngii*, including the following materials by mass percent: 20-30% of *Pleurotus eryngii* freeze-dried powder, 2-4% of hydrocolloid, and the balance of water. The *Pleurotus eryngii* freeze-dried powder has a particle size less than or equal to 0.15 mm. The hydrocolloid includes one or more selected from the group consisting of sodium alginate, gellan gum, pectin, methyl cellulose, locust bean gum, and guar gum. The present disclosure adopts *Pleurotus eryngii* freeze-dried powder which reduces a moisture content of *Pleurotus eryngii*. In addition, the problem that the *Pleurotus eryngii* with high fiber content blocks a nozzle for 3D printing can be solved by making the *Pleurotus eryngii* into small particle powder, and bioactive substances in the *Pleurotus eryngii* can be retained as much as possible. The addition of hydrocolloid can improve rheological properties of the *Pleurotus eryngii* freeze-dried powder, which increases viscosity of the 3D printing ink for *Pleurotus eryngii*, so as to continuously extrude the ink, and enhances mechanical strength of the 3D printing ink, such that the ink can maintain the print shape and is not easy to collapse. The results of examples show that the printing precision of the 3D printing ink for *Pleurotus eryngii* provided by the present disclosure can reach at least 99.5%, which meets the requirements of personalized design of 3D printing.

DETAILED DESCRIPTION OF THE EMBODIMENTS

Figure 1:
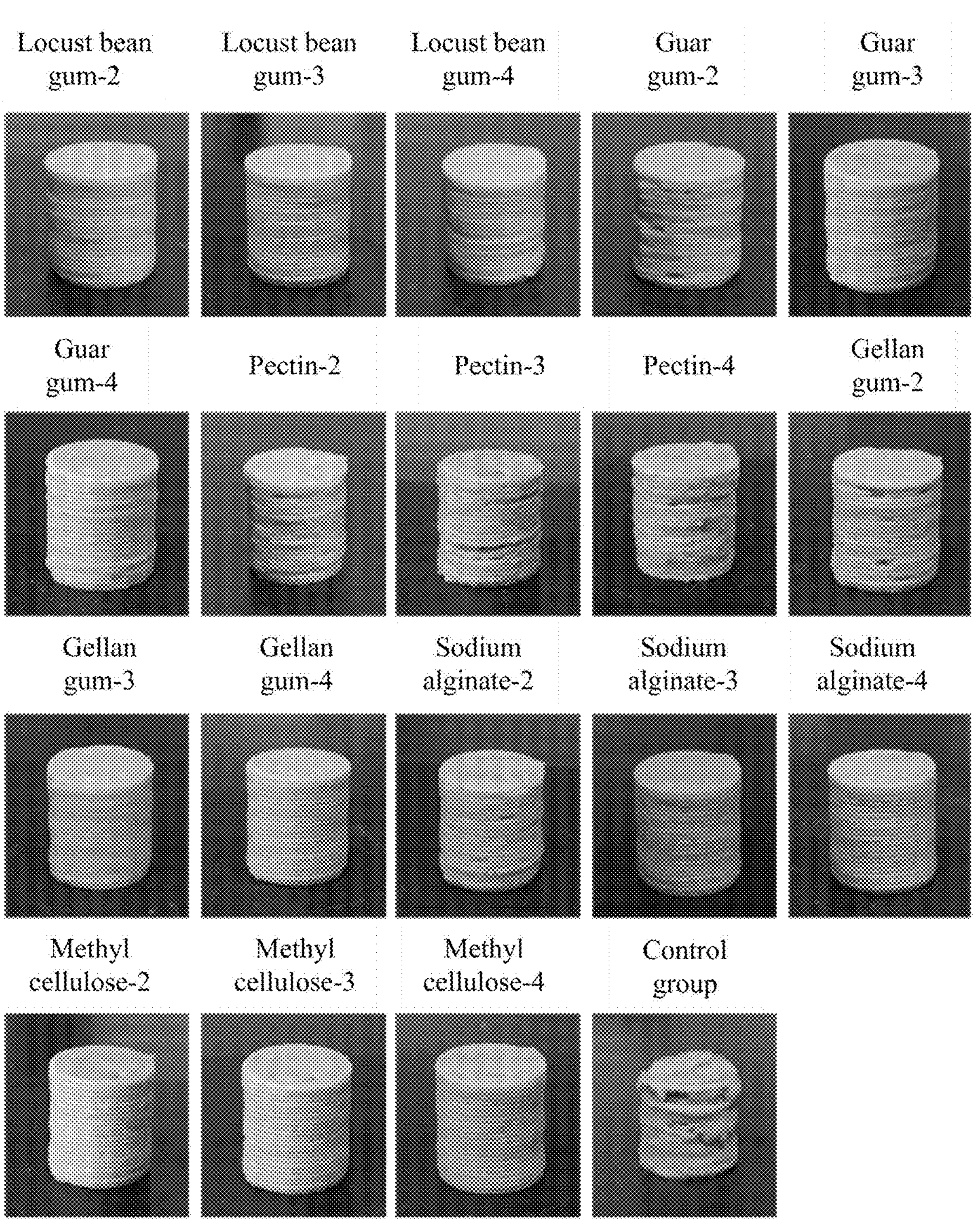
FIG. 1 is a diagram of 3D printed products of *Pleurotus eryngii* obtained from Application Examples 1 to 18 and Comparative Application Example 1.

The present disclosure provides a 3D printing ink for *Pleurotus eryngii*, including the following materials by mass percent:

20-30% of *Pleurotus eryngii* freeze-dried powder, 2-4% of hydrocolloid, and the balance of water.

The *Pleurotus eryngii* freeze-dried powder has a particle size less than or equal to 0.15 mm.

The hydrocolloid includes one or more selected from the group consisting of sodium alginate, gellan gum, pectin, methyl cellulose, locust bean gum, and guar gum.

Unless otherwise specified, the present disclosure has no special requirements for sources of the used materials, and commercially-available products well known to those skilled in the art may be adopted.

The 3D printing ink for *Pleurotus eryngii* provided by the present disclosure includes *Pleurotus eryngii* freeze-dried powder with a mass percent of 20-30%, preferably 20-25%.

In the present disclosure, the *Pleurotus eryngii* freeze-dried powder has a particle size less than or equal to 0.15 mm, preferably 0.1-0.15 mm.

In the present disclosure, a preparation method for the *Pleurotus eryngii* freeze-dried powder includes conducting vacuum freeze-drying on *Pleurotus eryngii*.

In the present disclosure, the vacuum freeze-drying is conducted at 20-60° C., more preferably 30-40° C., and at a vacuum degree of 0.2 MPa for 12-24 h, more preferably 18-24 h.

After the vacuum freeze-drying, the present disclosure preferably sieves the *Pleurotus eryngii* freeze-dried powder obtained by the vacuum freeze-drying. The screening equipment is preferably a 100-mesh sieve.

The *Pleurotus eryngii* freeze-dried powder adopted by the present disclosure reduces the moisture content of *Pleurotus eryngii*. Before freeze-drying, the *Pleurotus eryngii* has a moisture content of 88-92 wt. %, and after freeze-drying, the *Pleurotus eryngii* has a moisture content of 7-8 wt. %. In addition, the problem that the *Pleurotus eryngii* with high fiber content blocks a nozzle for 3D printing can be solved by making the *Pleurotus eryngii* into small particle powder, and bioactive substances in the *Pleurotus eryngii* can be retained as much as possible.

The 3D printing ink for *Pleurotus eryngii* provided by the present disclosure includes hydrocolloid with a mass percent of 2-4%, preferably 3%.

In the present disclosure, the hydrocolloid includes one or more selected from the group consisting of sodium alginate, gellan gum, pectin, methyl cellulose, locust bean gum, and guar gum, preferably one or more selected from the group consisting of the sodium alginate, the methyl cellulose, the locust bean gum, and the guar gum, more preferably the locust bean gum. When the hydrocolloids are of the above types, the present disclosure has no special limitations on the proportion of different hydrocolloids, and the proportion can be arbitrary.

The hydrocolloid can improve rheological properties of the *Pleurotus eryngii* freeze-dried powder, which increases viscosity of the 3D printing ink for *Pleurotus eryngii*, so as to continuously extrude the ink, and enhances mechanical strength of the 3D printing ink, such that the ink can maintain the print shape and is not easy to collapse.

The 3D printing ink for *Pleurotus eryngii* provided by the present disclosure includes the balance of water.

The present disclosure further provides a preparation method for the 3D printing ink for *Pleurotus eryngii* according to the above technical solutions, including the following steps.

The *Pleurotus eryngii* freeze-dried powder, the hydrocolloid, and the water are mixed, and water-bath heating is conducted to obtain the 3D printing ink for *Pleurotus eryngii*.

The present disclosure mixes the *Pleurotus eryngii* freeze-dried powder, the hydrocolloid, and the water. In the present disclosure, a process of mixing the *Pleurotus eryngii* freeze-dried powder, the hydrocolloid, and the water preferably includes mixing the *Pleurotus eryngii* freeze-dried powder and the hydrocolloid evenly and dispersing them in the water to obtain a dispersion solution. The present disclosure has no special limitations on the dispersion process, and the dispersion process well known in the art can be used to make the materials evenly mixed.

After the mixing, the present disclosure conducts water-bath heating on the dispersion solution obtained from the mixing to obtain the 3D printing ink for *Pleurotus eryngii*.

In the present disclosure, the water-bath heating is conducted at preferably 80-90° C., specifically 85-90° C. in examples of the present disclosure, for preferably 20-30 min, specifically 25-30 min in the examples of the present disclosure.

After the water-bath heating, the present disclosure preferably cools the 3D printing ink for *Pleurotus eryngii* obtained by the water-bath heating to a room temperature, and stores it into a 4° C. refrigerator for standby use. In the present disclosure, cooling is preferably natural cooling.

In the present disclosure, the hydrocolloid can be fully dissolved in the water phase through the water-bath heating.

The present disclosure further provides a use of the 3D printing ink for *Pleurotus eryngii* according to the above technical solutions or a 3D printing ink for *Pleurotus eryngii* prepared by the preparation method according to the above technical solutions in 3D printed food.

The present disclosure further provides a preparation method for 3D printed food of *Pleurotus eryngii*, including the following steps.

A printing model is provided, 3D printing parameters are set, and a G-code is generated.

A 3D printing ink for *Pleurotus eryngii* is used for 3D printing according to an instruction of the G-code to obtain the 3D printed food of *Pleurotus eryngii*.

The 3D printing ink for *Pleurotus eryngii* is the 3D printing ink for *Pleurotus eryngii* according to the above technical solutions or a 3D printing ink for *Pleurotus eryngii* prepared by the preparation method according to the above technical solutions.

The present disclosure provides the printing model, sets the 3D printing parameters, and generates a G-code. The present disclosure preferably uses computer software to draw the printing model. The computer software is preferably Rhino (3D modeling software). The present disclosure has no special limitations on the process of using the computer software to draw the required printing model, and the corresponding print model can be drawn using the drawing process well known in the art according to the actual needs.

In the present disclosure, the 3D printing parameters are as follows: a printing height of preferably 1.0-1.4 mm, more preferably 1.1-1.2 mm, a nozzle diameter of preferably 1.0-1.4 mm, more preferably 1.1-1.2 mm, a nozzle moving speed of preferably 20-30 mm/s, more preferably 21-25 mm/s, and a fill density of preferably 70-90%, more preferably 75-80%.

After the G-code is obtained, the present disclosure uses the 3D printing ink for *Pleurotus eryngii* for 3D printing according to an instruction of the G-code to obtain the 3D printed food of *Pleurotus eryngii*.

In the present disclosure, the equipment for 3D printing is preferably a 3D printer. Before 3D printing, the present disclosure preferably fills the 3D printing ink for *Pleurotus eryngii* into the cylinder of the 3D printer for compaction. The present disclosure discharges the air in the 3D printing ink for *Pleurotus eryngii* through compaction to prevent the influence on the shape of the printed product.

The technical solutions in the present disclosure will be described below clearly and completely with reference to the examples in the present disclosure, but they shall not be construed as limiting the scope of protection of the present disclosure.

Examples 1 to 18

*Pleurotus eryngii* freeze-dried powder after vacuum freeze-drying and hydrocolloid were mixed evenly and dispersed in water, and subjected to water-bath heating to obtain a 3D printing ink for *Pleurotus eryngii*. The specific parameters are shown in Table 1.

TABLE 1

Condition parameters of 3D printing ink for *Pleurotus eryngii* in Examples 1 to 18

| | *Pleurotus eryngii* freeze-dried powder | | | | | Hydrocolloid | | | | |
|---|---|---|---|---|---|---|---|---|---|---|
| Example | Temperature of vacuum freeze-drying/° C. | Vacuum degree of vacuum freeze-drying/MPa | Time of vacuum freeze-drying/h | Particle size/mm | Mass percent/% | Type | Mass percent/% | Mass percent of water/% | Temperature of water-bath heating/° C. | Time of water-bath heating/min |
| 1 | 40 | 0.2 | 24 | 0.15 | 25 | Locust bean gum | 2 | 73 | 90 | 30 |
| 2 | 40 | 0.2 | 24 | 0.15 | 25 | Guar gum | 2 | 73 | 90 | 30 |
| 3 | 40 | 0.2 | 24 | 0.15 | 25 | Gellan gum | 2 | 73 | 90 | 30 |
| 4 | 40 | 0.2 | 24 | 0.15 | 25 | Sodium alginate | 2 | 73 | 90 | 30 |
| 5 | 40 | 0.2 | 24 | 0.15 | 25 | Methyl cellulose | 2 | 73 | 90 | 30 |
| 6 | 40 | 0.2 | 24 | 0.15 | 25 | Pectin | 2 | 73 | 90 | 30 |

TABLE 1-continued

Condition parameters of 3D printing ink for *Pleurotus eryngii* in Examples 1 to 18

| | *Pleurotus eryngii* freeze-dried powder | | | | | Hydrocolloid | | | | |
|---|---|---|---|---|---|---|---|---|---|---|
| Example | Temperature of vacuum freeze-drying/° C. | Vacuum degree of vacuum freeze-drying/MPa | Time of vacuum freeze-drying/h | Particle size/mm | Mass percent/% | Type | Mass percent/% | Mass percent of water/% | Temperature of water-bath heating/° C. | Time of water-bath heating/min |
| 7 | 40 | 0.2 | 24 | 0.15 | 25 | Locust bean gum | 3 | 72 | 90 | 30 |
| 8 | 40 | 0.2 | 24 | 0.15 | 25 | Guar gum | 3 | 72 | 90 | 30 |
| 9 | 40 | 0.2 | 24 | 0.15 | 25 | Gellan gum | 3 | 72 | 90 | 30 |
| 10 | 40 | 0.2 | 24 | 0.15 | 25 | Sodium alginate | 3 | 72 | 90 | 30 |
| 11 | 40 | 0.2 | 24 | 0.15 | 25 | Methyl cellulose | 3 | 72 | 90 | 30 |
| 12 | 40 | 0.2 | 24 | 0.15 | 25 | Pectin | 3 | 72 | 90 | 30 |
| 13 | 40 | 0.2 | 24 | 0.15 | 25 | Locust bean gum | 4 | 71 | 90 | 30 |
| 14 | 40 | 0.2 | 24 | 0.15 | 25 | Guar gum | 4 | 71 | 90 | 30 |
| 15 | 40 | 0.2 | 24 | 0.15 | 25 | Gellan gum | 4 | 71 | 90 | 30 |
| 16 | 40 | 0.2 | 24 | 0.15 | 25 | Sodium alginate | 4 | 71 | 90 | 30 |
| 17 | 40 | 0.2 | 24 | 0.15 | 25 | Methyl cellulose | 4 | 71 | 90 | 30 |
| 18 | 40 | 0.2 | 24 | 0.15 | 25 | Pectin | 4 | 71 | 90 | 30 |

Comparative Example 1

The difference from the above examples was that hydrocolloid had an addition amount of 0%, water had an addition amount of 75%, and water-bath heating was conducted at 90° C. for 30 min.

Application Examples 1 to 18 and Comparative Application Example 1

The 3D printing ink for *Pleurotus eryngii* obtained in Examples 1 to 18 and the 3D printing ink for *Pleurotus eryngii* in Comparative Example 1 were placed in a cylinder of a 3D printer and compacted, and the air was discharged. The printing model drawn by computer was a cylinder with a diameter and a height both of 18-22 mm. The printing parameters were set: a printing height of 1.2 mm, a nozzle diameter of 1.2 mm, a nozzle moving speed of 25 mm/s, and a fill density of 80%. A G-code was obtained. 3D printing was conducted according to the G-code to obtain 3D printed food of *Pleurotus eryngii.*

Performance Testing (1) The 3D printed products of *Pleurotus eryngii* obtained in Application Examples 1 to 18 and Comparative Application Example 1 were photographed. The results are shown in FIG. 1.

It can be seen from FIG. 1 that the 3D printing ink for *Pleurotus eryngii* provided by the present disclosure is well formed, while the 3D printing ink for *Pleurotus eryngii* in Comparative Example 1 cannot be well formed.

(2) After printing, the height and upper and lower circle diameter of the printed sample were measured immediately, the obtained results were compared with the design value of the size, and the deviations of the three were calculated. The results are shown in Table 2.

$$\text{Deviation/\%=deviation/\%}=[(A_1-A_2)/A_2]*100 \quad (1)$$

$$\text{Overall precision score}=[(A_1/A_2)\text{ of height}+(A_1/A_2)\text{ of upper diameter}+(A_1/A_2)\text{ of lower diameter}]/3 \quad (2)$$

In Formulas (1) and (2), $A_1$ is the actual size of the printed sample, and $A_2$ is the model size of the printed sample.

TABLE 2

Precision of 3D printed products of *Pleurotus eryngii* in Application Examples 1 to 5, 7 to 11, and 13 to 17

| Application Example | Colloid | Height deviation (mm) | Upper diameter deviation (mm) | Lower diameter deviation (mm) | Overall precision score |
|---|---|---|---|---|---|
| 1 | Locust bean gum-2 | −2.46 ± 0.33ab | −0.09 ± 0.45b | −0.49 ± 0.71a | 99.0 |
| 2 | Guar gum-2 | −2.80 ± 0.82b | 1.03 ± 0.32a | −0.48 ± 1.28a | 98.6 |
| 3 | Gellan gum-2 | −3.00 ± 0.61b | −1.00 ± 0.94c | 0.25 ± 0.97a | 98.6 |
| 4 | Sodium alginate-2 | −1.71 ± 0.71a | −0.63 ± 0.16bc | −0.63 ± 0.64a | 99.0 |

TABLE 2-continued

Precision of 3D printed products of *Pleurotus eryngii* in Application Examples 1 to 5, 7 to 11, and 13 to 17

| Application Example | Colloid | Height deviation (mm) | Upper diameter deviation (mm) | Lower diameter deviation (mm) | Overall precision score |
|---|---|---|---|---|---|
| 5 | Methyl cellulose-2 | −2.30 ± 0.33ab | −1.33 ± 0.90c | −0.76 ± 0.93a | 98.5 |
| 7 | Locust bean gum-3 | 0.83 ± 0.65a | 0.03 ± 0.18a | −0.13 ± 0.16ab | 99.7 |
| 8 | Guar gum-3 | −3.58 ± 1.78c | −0.11 ± 0.47a | −1.29 ± 0.93c | 98.4 |
| 9 | Gellan gum-3 | −1.48 ± 0.81b | 0.03 ± 0.69a | 0.69 ± 0.67a | 99.3 |
| 10 | Sodium alginate-3 | −1.13 ± 0.92b | −0.21 ± 0.27a | −0.08 ± 0.28ab | 99.5 |
| 11 | Methyl cellulose-3 | −1.92 ± 0.66b | −0.48 ± 0.72a | −0.40 ± 1.21bc | 99.1 |
| 13 | Locust bean gum-4 | −1.96 ± 0.40b | −0.35 ± 0.53b | −0.71 ± 0.70b | 99.0 |
| 14 | Guar gum-4 | −2.00 ± 0.32b | 0.81 ± 0.35a | −0.12 ± 0.32ab | 99.0 |
| 15 | Gellan gum-4 | −2.21 ± 0.40b | −0.24 ± 0.36b | 0.05 ± 0.40ab | 99.2 |
| 16 | Sodium alginate-4 | −0.83 ± 0.82a | −0.41 ± 0.47b | 0.55 ± 0.41a | 99.4 |
| 17 | Methyl cellulose-4 | −0.85 ± 0.60a | −0.31 ± 0.38b | 0.05 ± 1.32ab | 99.6 |

It can be seen from Table 2 that the 3D printing precision of the 3D printing ink for *Pleurotus eryngii* provided by the present disclosure has a height deviation range of 0.83-3.58 mm, an upper diameter deviation range of 0.03-1.33 mm, and a lower diameter deviation range of 0.05-1.29 mm, and the overall precision score is 98.4-99.7, indicating that the 3D printing ink for *Pleurotus eryngii* provided by the present disclosure has excellent printing precision, while in Comparative Application Example 1, the extrusion fails, the 3D printing behavior fails, and its precision cannot be calculated.

(3) The viscosity of the 3D printing ink for *Pleurotus eryngii* was tested. The results are shown in FIG. 2, where PEP is a control group, namely *Pleurotus eryngii* freeze-dried powder, GG is PEP+gellan gum, SA is PEP+sodium alginate, LBG is PEP+locust bean gum, Guar is PEP+guar gum, Pectin is PEP+pectin, and MC is PEP+methyl cellulose.

Figure 2:
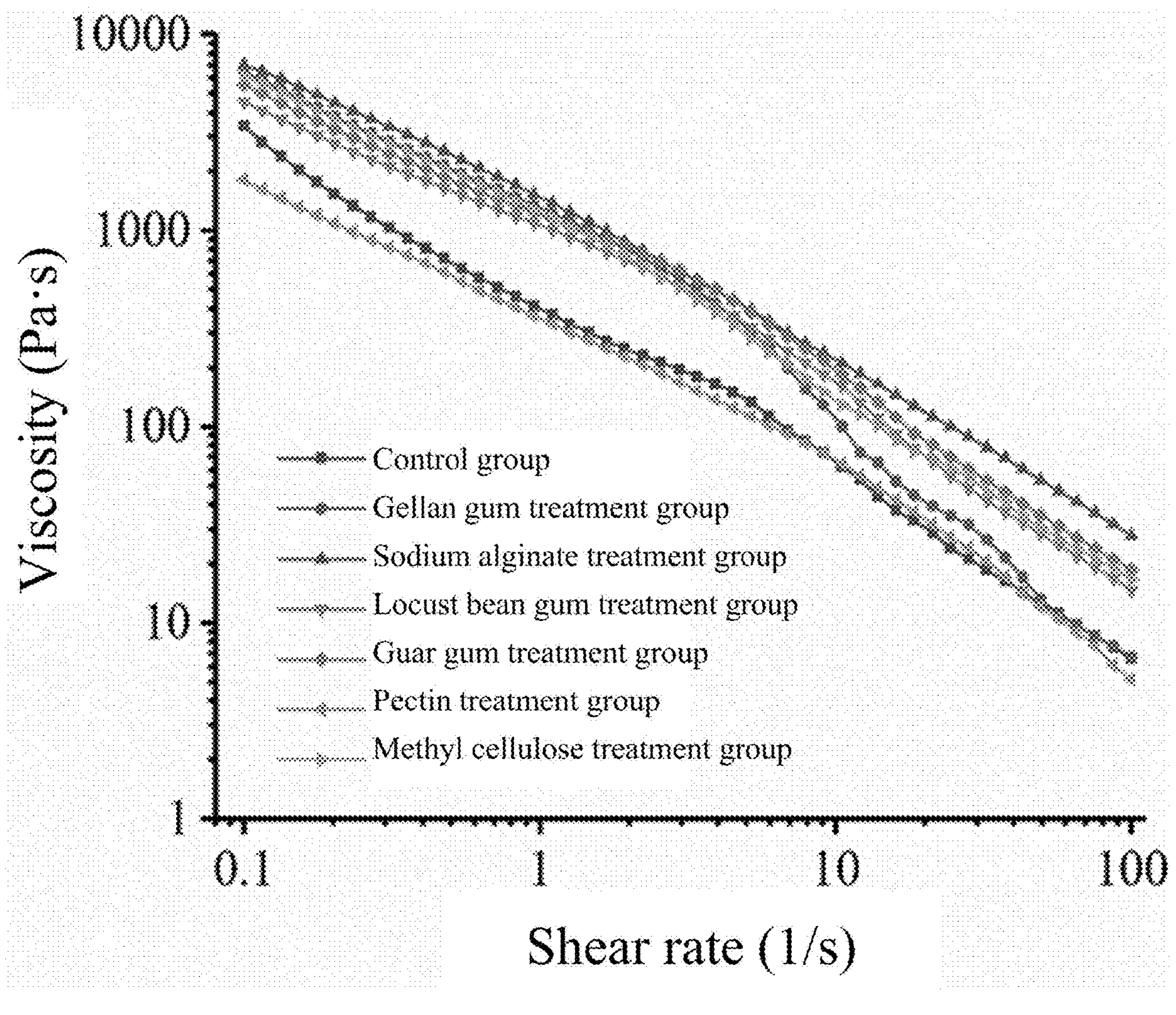
FIG. 2 is a viscosity contrast diagram of 3D printing inks for *Pleurotus eryngii* prepared by different kinds of hydrocolloids.

It can be seen from FIG. 2 that with the increase of the shear rate, the viscosity of the 3D printing ink for *Pleurotus eryngii* added with the hydrocolloid is higher than that of the control group.

(4) The mechanical strength (represented by tan δ) of the 3D printed product prepared from the 3D printing ink for *Pleurotus eryngii* was tested. The results are shown in FIG. 3, where PEP is a control group, namely *Pleurotus eryngii* freeze-dried powder, GG is PEP+gellan gum, SA is PEP+sodium alginate, LBG is PEP+locust bean gum, Guar is PEP+guar gum, Pectin is PEP+pectin, and MC is PEP+methyl cellulose.

Figure 3:
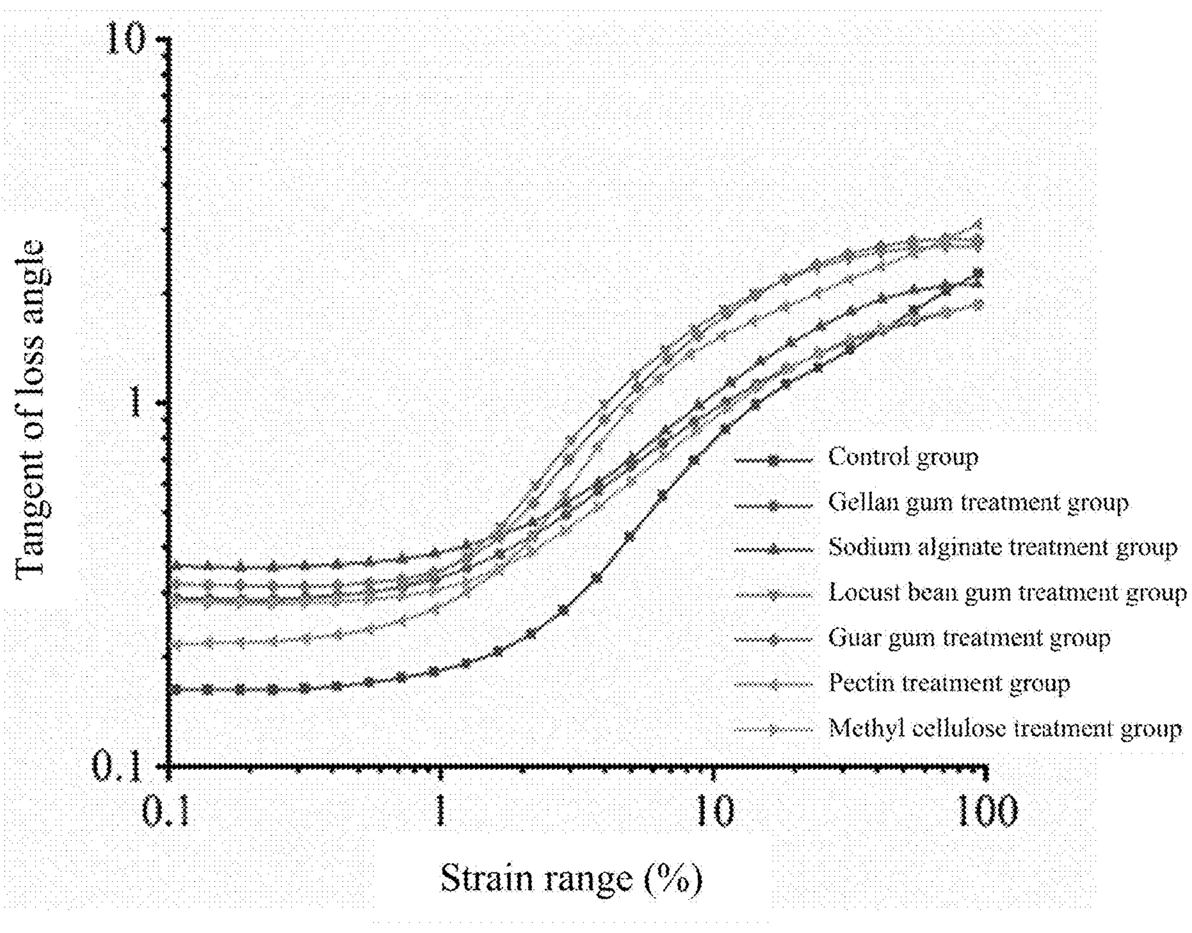
FIG. 3 is a comparison diagram of mechanical strength of 3D printed products made of the 3D printing inks for *Pleurotus eryngii* prepared by different kinds of hydrocolloids.

It can be seen from FIG. 3 that when the strain is less than 1%, the tan δ (tangent value of loss angle) of the hydrocolloid treatment group is greater than that of the control group and the tan δ is less than 1, which proves that the mechanical strength of 3D printed products increases with the addition of the hydrocolloid.

Although the above example has described the present disclosure in detail, it is only a part of, not all of, the examples of the present disclosure. Other examples may also be obtained by persons based on the example without creative efforts, and all of these examples shall fall within the protection scope of the present disclosure.

What is claimed is:

1. A preparation method for preparing 3D printed food of *Pleurotus eryngii*, the method comprising:

providing a printing model, setting 3D printing parameters, and generating a G-code; and using a 3D printing ink for *Pleurotus eryngii* according to an instruction of the G-code to obtain the 3D printed food of *Pleurotus eryngii*, wherein the 3D printing ink for *Pleurotus eryngii* consists of the following materials by mass percent:

20-30% of *Pleurotus eryngii* freeze-dried powder, 2-4% of hydrocolloid, and water, wherein the *Pleurotus eryngii* freeze-dried powder has a particle size of less than or equal to 0.15 mm; and the hydrocolloid is one or more substances selected from the group consisting of a sodium alginate, a gellan gum, a pectin, a methyl cellulose, a locust bean gum, and a guar gum.

2. The preparation method according to claim 1, wherein the hydrocolloid is one or more substances selected from the group consisting of the sodium alginate, the locust bean gum, and the guar gum.

3. The preparation method according to claim 1, wherein the *Pleurotus eryngii* freeze-dried powder is prepared by a method comprising conducting vacuum freeze-drying on *Pleurotus eryngii* at 20-60° C. for 12-24 h.

4. The preparation method according to claim 3, wherein the vacuum freeze-drying is conducted at a vacuum degree of 0.2 MPa.

5. The preparation method according to claim 1, wherein the 3D printing parameters include a printing height of 1.0-1.4 mm, a nozzle diameter of 1.0-1.4 mm, a nozzle moving speed of 20-30 mm/s, and a fill density of 70-90%.

* * * * *